July 10, 1923.

A. L. FITZ GIBBON

WINDSHIELD CLEANER

Filed April 15, 1922

1,461,087

Inventor
Arthur L. FitzGibbon
By Church & Church
His Attorneys

Patented July 10, 1923.

1,461,087

UNITED STATES PATENT OFFICE.

ARTHUR L. FITZ GIBBON, OF WASHINGTON, DISTRICT OF COLUMBIA.

WINDSHIELD CLEANER.

Application filed April 15, 1922. Serial No. 553,065.

*To all whom it may concern:*

Be it known that I, ARTHUR L. FITZ GIBBON, a citizen of the United States, residing at Washington, in the District of Columbia, have invented certain new and useful Improvements in Windshield Cleaners; and I do hereby declare the following to be a full, clear, and exact description of the same, reference being had to the accompanying drawings, forming part of this specification.

This invention relates to a new and improved wiper for cleaning the front glass of an automobile wind shield, and has for its principal object the provision of a device of the character described that will be simple and efficient and which will require no attention after being installed as it will automatically make adjustment for the wear of the felt or rubber strip of the wiper.

Different forms of wind shield cleaners have been proposed from time to time, but none of them appear to be satisfactory due to two principal faults, first, that in certain of these devices the fan is placed beyond the side line of the automobile, that is, to one side of the glass pane of the wind shield, and the second and more important disadvantage is that these devices are only satisfactory when the wiping element is quite new and as wear occurs the cleaner will no longer touch the glass.

By rigidly joining the air operated fan and the cleaning strip holding element or wiper and by mounting the rigid connection so that it may slide in its bearing as well as rotate all of the disadvantages pointed out are overcome.

In the following specification I have described my invention in detail in its present preferred form and have limited the description to a device for use with an automobile wind shield, but it is obvious that the invention could be adapted without further invention for use in a locomotive cab for example or on an airplane.

In the drawings,—

Figure 1:
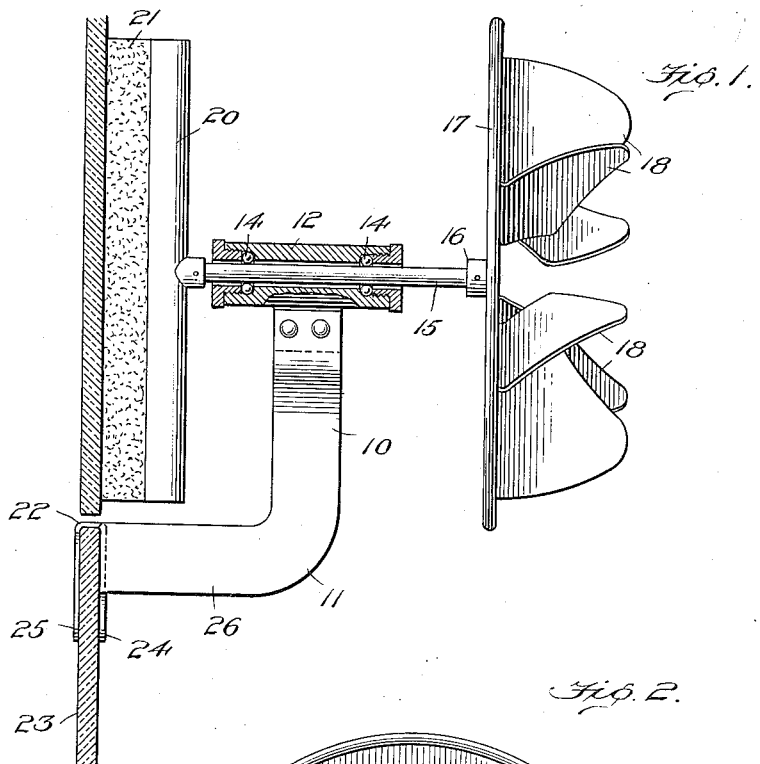
Figure 1 is a side elevation of my device as applied to a two-piece automobile wind shield.
Figure 2:
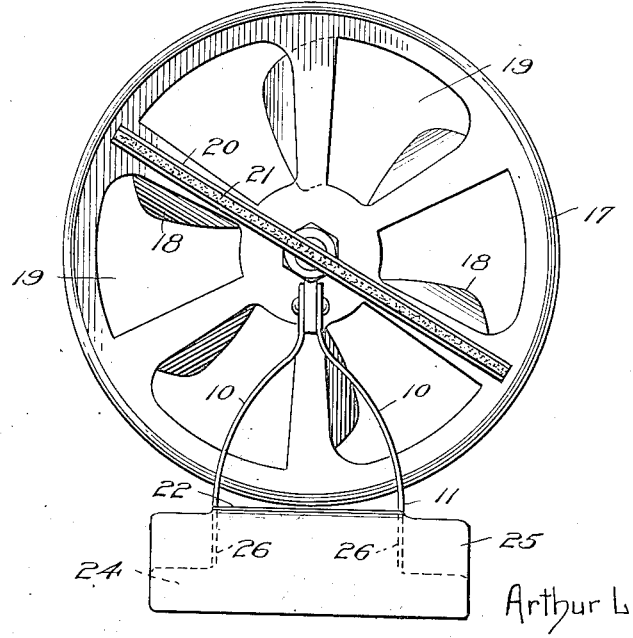
Fig. 2 is a rear view of the device.

The post 10 of the bracket 11 carries at its upper end an elongated bearing 12 preferably provided with rollers 14 furnishing the sole support for a shaft 15, which is not only rotatable in the bearing 12, but is slidably mounted therein, this being important for a reason hereinafter pointed out.

At its front end the shaft 14 is threaded or otherwise secured to a head 16 on a wheel fan 17, the latter preferably consisting of a single piece of sheet metal struck out to provide blades 18 and curved in accordance with approved practice to utilize a maximum amount of the energy provided by the air caused by the movement of the vehicle. In its best form these integral struck out blades project from the back or rim of the fan at an angle greater than 45° so that comparatively large openings 19 are provided between the blades so that when the fan is rotating at its usual speed the driver may look through the rapidly moving blades and see the entire field covered by the blades by virtue of persistence of vision.

At its rear end the shaft 15 is rigidly secured to a wiper back 20 preferably of sheet metal channel-shaped and sufficiently resilient to firmly grip a cleaner element 21 of felt or rubber, the cleaner and the back together forming a wiper.

The lower part of the bracket 11 which may or may not be integral with the post 10 consists of a channel 22 adapted to seat over the top of the lower pane 23 on the wind shield which is resiliently gripped between the front and rear flanges 24 and 25 respectively, of the channel. A pair of arms 26 preferably integral with the channel member 22 extend forward and are secured to the diverging legs 27 preferably integral with the post 10.

As the automobile is operated the fan is rotated by the air currents caused by movement of the automobile and the wiper is pressed against the front face of the upper pane of the wind shield and by its rotation cleans a circle of sufficient size to enable the operator to see to guide his machine. While it is true that the wiper and the fan both rotate in the line of vision of the operator this is found to be of no disadvantage in view of the results of persistence of vision.

As the cleaner member 21 wears, the shaft 15 slides rearwardly thus keeping the wiper at all times in contact with the front pane. This also permits the use of different widths of felt or rubber stripping in the flexible back of the wiper.

What I claim is:

1. In a wind shield cleaner, a wiper mounted for rotation in contact with the glass of said shield, an air operated fan coaxial therewith, and means operatively connecting said fan and wiper so that the fan will rotate the wiper.

2. In a wind shield cleaner, a bearing, a shaft rotatably and slidably mounted in said bearing, a wiper secured to said shaft to rotate in contact with the glass of said shield and means for driving said shaft, said slidable mounting of said shaft permitting the shaft to adjust for the wear of the wiper.

3. In a wind shield cleaner, a bracket adapted to be secured to the lower pane of a wind shield, a shaft rotatably and slidably mounted in said bracket, a fan on one end of said shaft, and a wiper mounted on the other end of said shaft so as to contact with the front surface of the upper pane of said wind shield.

ARTHUR L. FITZ GIBBON.